United States Patent [19]

Myatt

[11] Patent Number: 5,319,354
[45] Date of Patent: Jun. 7, 1994

[54] ANTENNA STRUCTURE FOR COMMUNICATING WITH AN ELECTRONIC TAG IMPLANTED IN A PNEUMATIC TIRE

[75] Inventor: David Myatt, Chateaugay, France

[73] Assignee: Compagnie Generale Des Etablissements Michelin-Michelin & Cie, Clermont-Ferrand Cedex, France

[21] Appl. No.: 977,167

[22] Filed: Nov. 16, 1992

[30] Foreign Application Priority Data

Nov. 14, 1991 [FR] France .................................. 91 14264

[51] Int. Cl.$^5$ ............................................. G08B 13/24
[52] U.S. Cl. .................................... 340/572; 340/674; 340/676; 343/866
[58] Field of Search ..................... 340/572, 674, 676; 343/866

[56] References Cited

U.S. PATENT DOCUMENTS

| | | | |
|---|---|---|---|
| 1,796,295 | 3/1931 | Loth | 342/433 |
| 3,160,865 | 12/1964 | Tourtellotte | 360/1 |
| 3,460,119 | 8/1969 | Ugo et al. | 360/1 |

FOREIGN PATENT DOCUMENTS

| | | |
|---|---|---|
| 0043591 | 1/1982 | European Pat. Off. . |
| 0257688 | 3/1988 | European Pat. Off. . |
| 8602186 | 4/1986 | PCT Int'l Appl. . |

*Primary Examiner*—Glen Swann
*Attorney, Agent, or Firm*—Oblon, Spivak, McClelland, Maier & Neustadt

[57] ABSTRACT

The identification of pneumatic tires by electromagnetic coupling with a transponder embedded in the thickness of the pneumatic tire is made possible by a suitable interrogation antenna so that, regardless of the position of the transponder in the pneumatic tire, a position which is unknown, the coupling is always of the same quality. Such an antenna may take the form of a figure eight or of a closed torus.

15 Claims, 3 Drawing Sheets

ANTENNA STRUCTURE FOR COMMUNICATING WITH AN ELECTRONIC TAG IMPLANTED IN A PNEUMATIC TIRE

BACKGROUND OF THE INVENTION

1. Field of the Invention

The present invention is directed to a system for the identification of pneumatic tires which have an electronic tag embedded in their thickness. More particularly, it relates to the structure of antennas adapted for communication in such systems.

2. Discussion of the Background

It has been sought for a very long time to incorporate, in a pneumatic tire, transponders making identification possible by electromagnetic signals, notably to be able to control the flow during the production of pneumatic tires. One of the problems encountered in incorporating transponders in a pneumatic tire is that the orientation of the transponder with respect to the interrogation station, and more particularly with respect to the antenna used for the interrogation, generally is not known. Now, unless the orientation of the antenna corresponds to the orientation of the antenna of the transponder, the read or write distance is very severely reduced. If the antenna and transponder are perpendicular with respect to one another, then communication is not even possible.

The available solutions in the prior art for solving this problem are essentially of three different types. First of all, it has been proposed to scan the pneumatic tire containing the transponder with an inspection antenna to try all possibilities of relative position and orientation between the inspection antenna and the antenna of the transponder incorporated in the pneumatic tire until a signal is detected. By way of example, U.S. Pat. No. 3,160,865 proposes a communication device whose antenna rotates.

It can also be conceived to visually locate, on the surface of the pneumatic tire, the position and orientation of the transponder it contains. This introduces an additional constraint during the production of the pneumatic tire, and this constraint is generally unacceptable.

Finally, it can be conceived to solve this problem by multiplying the interrogation antennas so as to arrange them according to all possible orientations so that at least one of them is able to communicate with the antenna of the transponder. This solution not only multiplies the cost of the interrogation device, but further involves specific technical difficulties that will be explained below.

In FIGS. 1 and 2, the problem posed by communication with a transponder incorporated in a pneumatic tire is illustrated. In FIG. 1, a pneumatic tire 1 comprises a transponder with its antenna 2 implanted in the sidewall or in the bead thereof. Generally, the transponder 2 is implanted in the upper part of the bead, more specifically in the bead filler. Pneumatic tire 1, as it appears in FIG. 1, is placed flat on a conveyor belt and travels in direction P toward a communication antenna 3. The antenna 3 is placed flat under the conveyor belt or on it. Basically, antenna 3 forms a plane parallel to the pneumatic tire 1. This antenna 3 consists of numerous turns 30 wound on a support made of nonmagnetic material, each turn 30 comprising the rectangle that appears in FIGS. 1 and 2. If current is fed to such a winding, a magnetic flux $\phi 3$ is generated whose orientation is perpendicular to the plane of FIG. 1, and whose direction depends on the direction of the applied current. The magnetic axis of such a winding is defined as being the orientation of the resulting flux (south-north) that such a winding would develop if it were fed direct current.

Transponder with its antenna 2 is implanted in the pneumatic tire at a location that is unknown. All the possible positions are symbolized in FIG. 1 by positions a1, b1, c1, ..., h1. The transponder comprises a communication antenna 2 made by winding a large number of turns on a small, elongated, cylindrical ferrite core and which can be schematically viewed on the drawings. The magnetic axis (according to the conventional definition given above) of such an antenna 2 is formed in the plane of FIG. 1, along the major axis of the oval diagramming the position of the transponder in FIG. 1. If, in the pneumatic tire, the azimuth position of the transponder (hence of its antenna 2) is unknown, it is known, on the other hand, that it is located at the level of the bead filler, with its antenna 2 oriented as indicated above. In other words, only a single degree of freedom to characterize the implantation of the antenna 2 of the transponder remains unknown.

If the transponder occupies position b1 or f1, then the coupling between the antenna 2 and antenna 3 is never possible regardless of the progress of the pneumatic tire toward antenna 3. The double arrows seen on antenna 3 in FIG. 1 represent the flux surrounding the turns of the winding in the immediate vicinity of these turns 30. This is the orientation that would be assumed by the needle of a compass placed a few centimeters above antenna 3, i.e., about at the level at which the sidewall of the pneumatic tire travels. It is understood that, in this embodiment of the prior art, the lines of flux will always be perpendicular to the magnetic axis of the antenna 2 of the transponder if the latter occupies position b1 or f1, and thus coupling is not possible with antenna 3.

If, on the other hand, the transponder occupies position a1, then when the pneumatic tire is just above antenna 3, coupling is possible with position a1 indicated on antenna 3. The same reasoning leads to the observation that coupling will be possible if the transponder occupies positions c1, e1 or g1.

If the transponder occupies positions h1 or d1, then, with antenna 3 as it appears in FIG. 1, coupling is random or more difficult because the flux emanating from the antenna of the transponder is never aligned with the direction of maximum sensitivity of antenna 3, as is shown by the double arrows on antenna 3 in FIG. 1. On the other hand, if the same antenna 3 occupied the entire width of the belt, and more specifically if its width were at least equal to the diameter of the implantation of the transponder 2 in the pneumatic tire 1, then communication would be possible since the flux surrounding transverse turns 30 of antenna 3 would be aligned with the magnetic axis of the antenna 2 of the transponder.

FIG. 2 is a perspective representation of the same antenna 3 in which magnetic axis $\phi 3$ has been represented in the form of an arrow with a solid line, and the lines of flux surrounding the turns have been represented in the form of broken lines. Also shown in FIG. 2 is the arrangement of each turn 30 with respect to the rectangular frame supporting them.

In summary, it is seen that the reading or detecting of the transponder will always be possible if the transponder occupies positions near positions a1, c1, g1 or e1 (50% probability), that it will always be impossible if the transponder occupies positions such as b1 and f1

(25% probability) and that the reading can be random for positions h1 and d1 (25% probability), as a function of the exact position of the pneumatic tire 1 on the conveyor belt and of the position and the size of the antenna 3 with respect to this conveyor belt.

SUMMARY OF THE INVENTION

Accordingly, one object of the present invention is to provide a novel antenna structure which can overcome these drawbacks in such prior art devices.

According to the present invention, instead of multiplying the interrogation antennas to create magnetic fields with multiple orientations, the present invention proposes a new form of wound antenna that can develop a magnetic field whose orientation will always correspond to one of the orientations required to be able to read the transponder embedded in the pneumatic tire.

The present invention achieves these results by an antenna for transmitting a signal between an electronic tag implanted in a sidewall or bead of a pneumatic tire and a device for processing the signal detected by this antenna. According to the present invention, the pneumatic tire is placed flat on a conveyor belt and the implanted tag is provided with a winding for transmission of a signal by electromagnetic coupling. A conveyor belt makes it possible to move the pneumatic tire in a linear direction in front of the antenna. The antenna comprises a single winding with a single plurality of wound turns on a support. The antenna has a central part to be arranged approximately at the center of the conveyor belt, and two lateral edges to be placed approximately on each side of the conveyor belt, the lateral edges being viewed transversely with respect to the direction of movement of the conveyor belt. Further, the antenna comprises turn strands arranged so the flux generated around the strands describes a loop whose plane is perpendicular to the direction of movement in its central part, then changes gradually in orientation to become parallel to the direction of movement, while always remaining perpendicular to the conveyor belt when movement occurs from the central part toward each of the lateral edges of the antenna.

Another problem that is difficult to solve is to make these antennas very sensitive to the flux emanating from the transponders embedded in the pneumatic tires while making them insensitive to the ambient flux resulting from the environment of the workshop. This problem is solved in the present invention by structuring an antenna so that, in viewing the median plane of the antenna oriented parallel to the direction of movement of the belt, and perpendicular to the belt, the antenna support is formed on each side of the median plane so that the wound turns on one side of the antenna support have a resulting magnetic axis oriented in the opposite direction of the magnetic axis of the wound turns on the other side of the antenna support.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
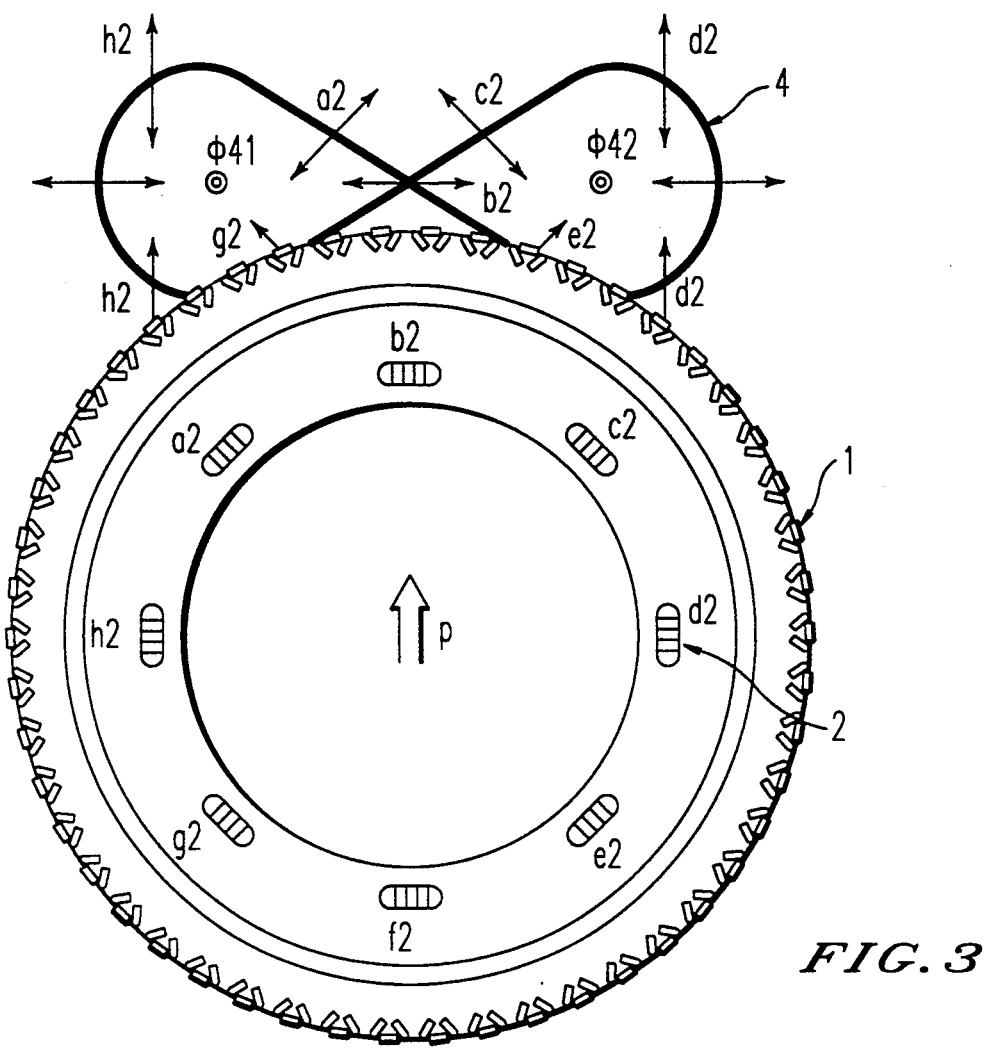
FIG. 3 illustrates a pneumatic tire traveling on a conveyor belt and approaching a communication antenna of the invention.
Figure 4:
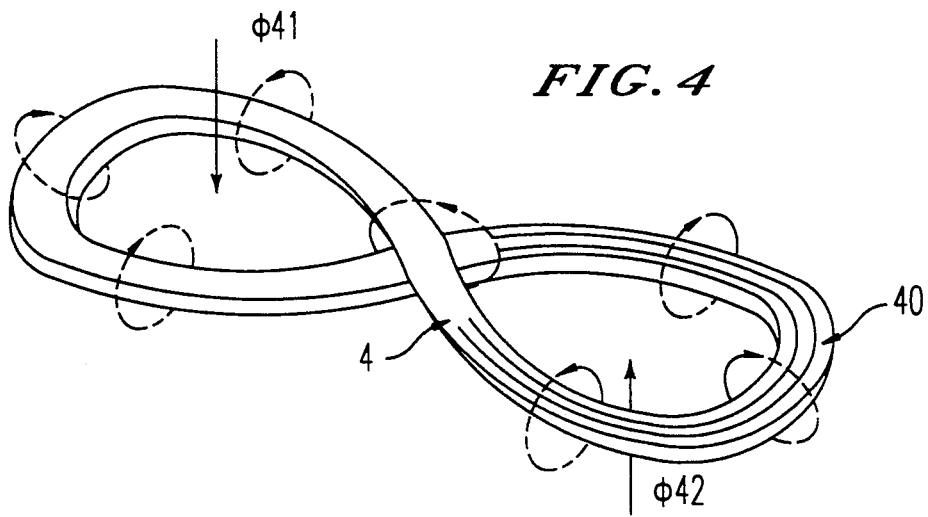
FIG. 4 shows a perspective view of the communication antenna of FIG. 3.

Referring now to the drawings, wherein like reference numerals designate identical or corresponding parts throughout the several views, and more particularly to FIGS. 3 and 4 thereof, there is shown an embodiment of the system of the present invention.

Figure 1:
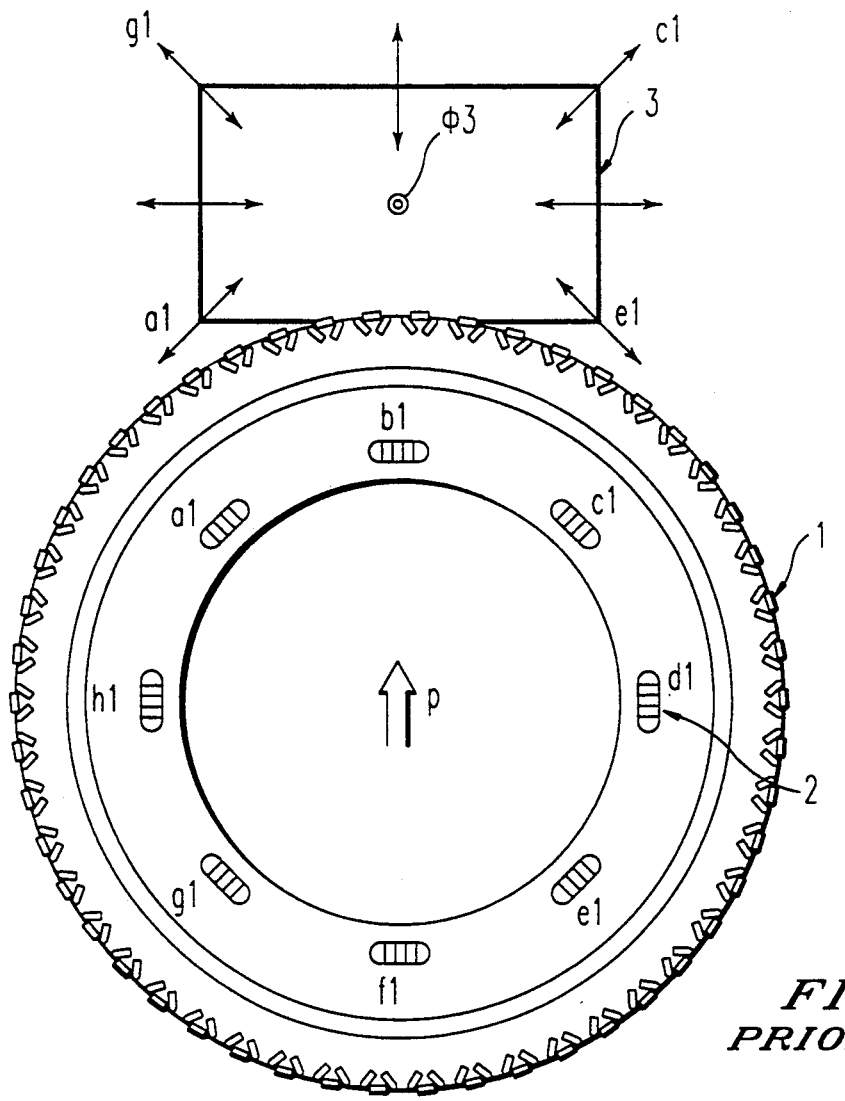
FIG. 1 illustrates a pneumatic tire traveling on a conveyor belt and approaching a communication antenna.
Figure 2:
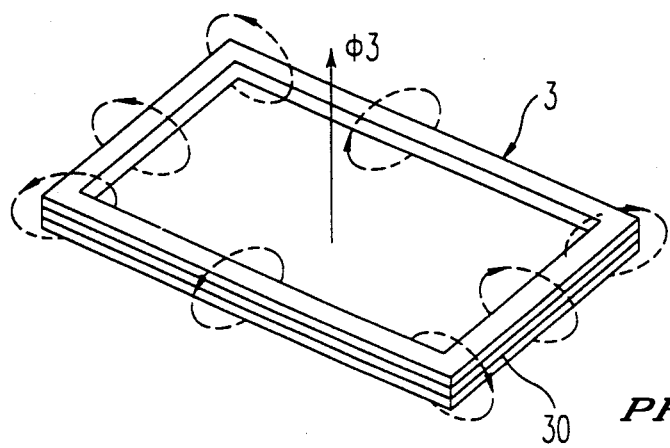
FIG. 2 illustrates a perspective view of the communication antenna of FIG. 1.

As shown in FIGS. 3 and 4, antenna 4 is made from a closed loop, just like the one of FIG. 2, but this loop is folded over on itself so as to take the shape of a figure eight or the wings of a butterfly. The support for antenna 4 is preferably made of a nonmagnetic material so as not to channel the lines of flux. Each turn 40 is formed along the loop in a figure eight shape. The magnetic field produced by an antenna having this shape of a figure eight is shown by arrows made in broken lines in FIG. 4. It can be seen that there always exists one or more strands of turns oriented so there is a maximum coupling between the strand in question and the antenna 2 of the transponder for any position of the transponder. That is, by utilizing an antenna 4 with such a shape as in the present invention, there must be, for any position of the transponder, strands of turns oriented perpendicular to the axis of the ferrite core (magnetic axis) of the antenna of the transponder, i.e., perpendicular to the major axis of the oval forming the implantation of the transponder.

It is seen that this antenna 4 comprises a plane of symmetry, and that the resulting flux produced by each of the two parts is oriented in opposite directions. In other words, magnetic axis $\phi_{41}$ of the left part points downward, while magnetic axis $\phi_{42}$ of the right part points upward. The combined effects of each of the two parts results in the fact that, at the center of this antenna 4, the preferred coupling direction is transverse, as shown by the double arrow appearing at the center of antenna 4 in FIGS. 3 and 4.

If all the position possibilities of transponder implanted in pneumatic tire 1 are again examined, it is seen that coupling between the antenna 2 of the transponder and antenna 4 is always possible. If the position of the transponder is b2 or f2, then the coupling will be made at the center of the antenna 4 at b2. If the position of the transponder is h2, then there are two possible coupling positions h2 on antenna 4. And so on, it is seen that all the possible positions of transponder have a coupling location on antenna 4. Furthermore, with the respective orientations of magnetic axes $\phi_{41}$ and $\phi_{42}$, antenna 4 is not sensitive to a flux coming from a remote source which encompasses the entire antenna 4 in a homogeneous way.

The conditions to be met for using such an antenna 4 are that the transverse dimension of this antenna 4 must be sufficient to include all the positions possible for the transponder. Preferably, the antenna support must be shaped as it appears in FIG. 3 so that the preferred coupling directions, while traveling along the turns, are parallel to the corresponding location at the possible orientations of the transponder implanted in the pneumatic tire, the magnetic axis of the transponder always being located on a circumference of the pneumatic tire 1. Preferably, the orientation of the turn strands change gradually and evenly to go from the central part to each of the lateral edges. The antenna 4 must be positioned so that its median plane includes the direction of movement of the pneumatic tire 1 with respect to the antenna 4, and the median plane corresponds approximately to the center of the pneumatic tire 1.

If this antenna 4 is placed under a conveyor transporting belt, for moving pneumatic tire 1 along direction P, for pneumatic tire 1 equipped with a transponder embedded in any of the positions represented in FIG. 3, it is seen that when the pneumatic tire 1 passes above the antenna 4, and there will always be a moment during which the magnetic field of antenna 4 and of the antenna 2 of the transponder are aligned, so that communication between the antenna 4 and antenna 2 of the transponder can be readily established. This invention of course requires that the antenna 2 of the transponder is implanted in the sidewall of the pneumatic tire 1 to have a magnetic axis tangent to a circumference of the pneumatic tire 1. This condition is very easy to achieve. This antenna 4, in the shape of a butterfly, takes care of all the respective orientation problems of the antenna 4 with respect to the pneumatic tire 1 and thus the operation of identification by electronic tag is largely facilitated.

Figure 5:
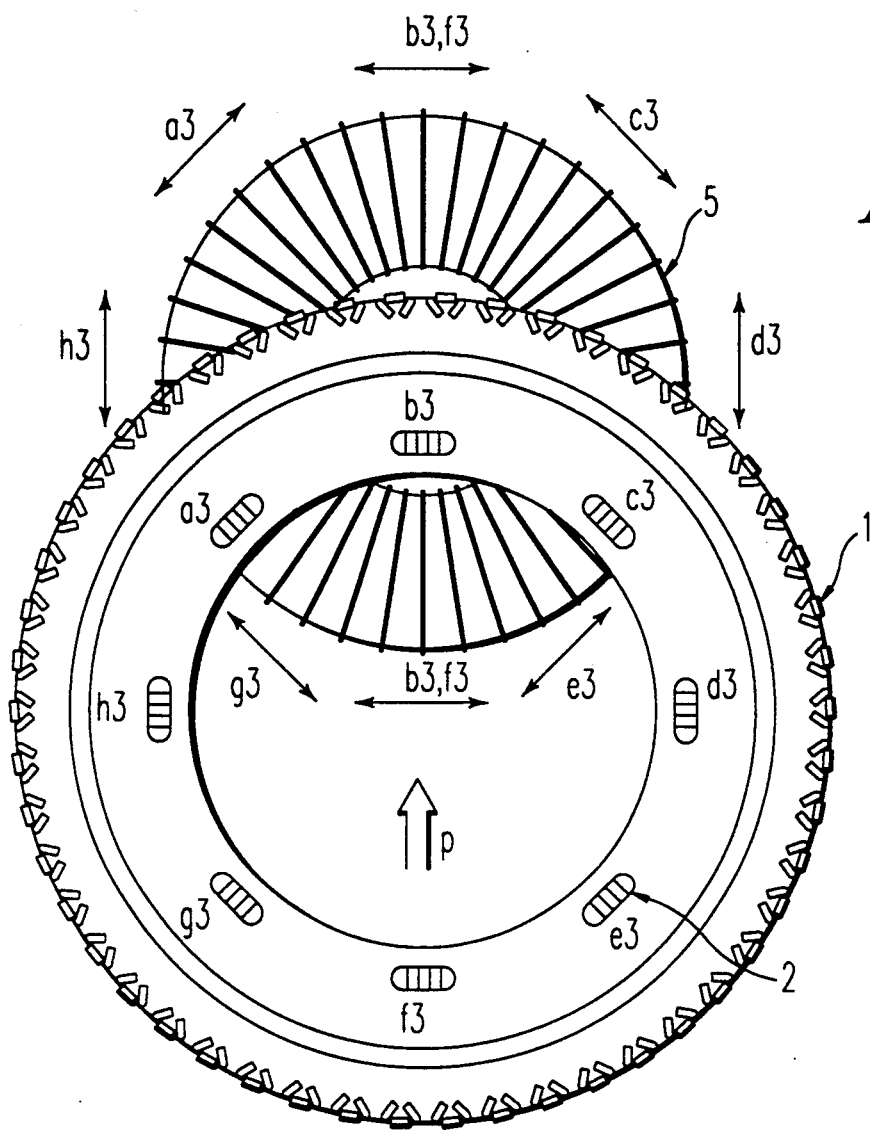
FIG. 5 shows a pneumatic tire traveling toward an antenna made according to a further embodiment of the present invention.
Figure 6:
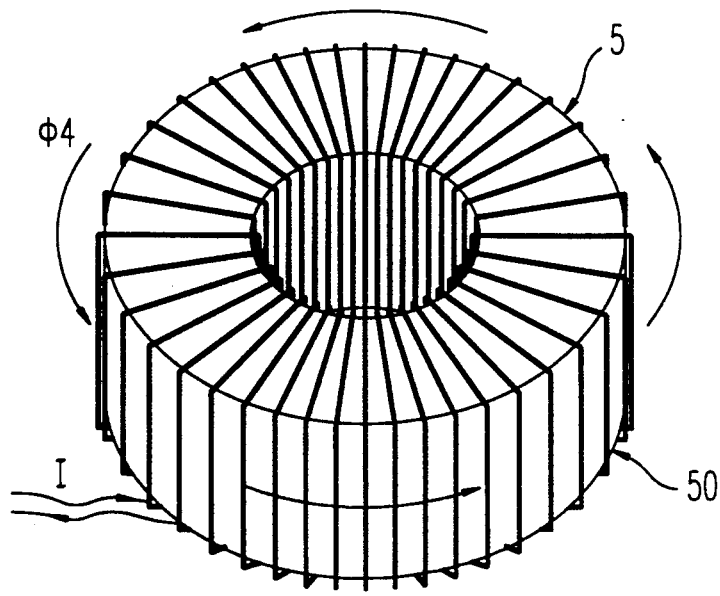
FIG. 6 shows a perspective of the communication antenna of FIG. 5.

FIG. 5 and 6 disclose an antenna system according to a further embodiment of the present invention. The antenna 5 appearing in FIG. 6 is made on a closed toric support made of nonmagnetic material on which a plurality of turns 50 are wound so as to make a toric winding. It is important that the support be made of nonmagnetic material so as not to concentrate the magnetic flux at the interior of the turns. So that such a toric antenna 5 can communicate with a pneumatic tire 1 that will be made to pass above it, it is necessary that there be a sizable leakage flux. It is the leakage flux that will be used to couple antenna 5 with antenna 2 of the transponder embedded in pneumatic tire 1.

FIG. 5 shows the use of such an antenna 5 that has been implanted, for example, under a conveyor belt on which pneumatic tire 1 passes, in the direction represented by arrow P. The various possible locations of the transponder are indicated by positions a3 to h3 on pneumatic tire 1 of FIG. 5. The corresponding coupling positions on antenna 5 are designated by references a3 to h3. Here again, it is seen that if pneumatic tire 1 passes above the toric antenna 5 thus formed, there will always be a moment during which the coupling between the transponder and the antenna 5 will be possible. Further, if an antenna 5 of this type is presented at the pneumatic tire 1 so that the axes of the torus and of the pneumatic tire are merged, then the relative rotation of the antenna 5 and of the pneumatic tire 1 in one turn also always makes possible a read and/or write communication with the transponder.

Not only do antennas 4 and 5, just described, solve the problem of the relative orientation of pneumatic tire 1 with respect to these antennas, but further they both enjoy an additional advantage with respect to other solutions of the prior art. Actually, the shape of these antennas makes it possible for them to reject inherently, for the reasons explained above, electromagnetic disturbances originating outside the transponder of the pneumatic tire. Actually, electromagnetic interferences that come from elsewhere will develop an approximately homogeneous field that encompass these entire antenna. Now, a homogeneous field is incapable of inducing a voltage in an antenna such as antennas 4 and 5 because these antennas behave like two antennas wound in opposition. These types of antenna are thus very insensitive to electromagnetic interferences, in contrast with all the antennas known in the prior art, all of which require the ability to discriminate between a useful signal and background noise. This problem is quite particularly difficult when several antennas are used in parallel, with various orientations, because then all these antennas would pick up background noise, while only one among them is to pick up the useful signal. Antennas 4 and 5 of the present invention allow the antennas not to be affected by such background noise.

Obviously, numerous modifications and variations of the present invention are possible in light of the above teachings. It is therefore to be understood that within the scope of the pending claims, the invention may be practiced otherwise than as specifically described herein.

What is claimed as new and desired to be secured by letters patent of the United States is:

1. An antenna detecting a signal from an electronic tag implanted in a sidewall or a bead of a pneumatic tire, wherein the pneumatic tire is placed flat on a conveyor belt, and the implanted electronic tag is provided with a winding for the transmission of said signal by electromagnetic coupling, said conveyor belt making it possible to move said pneumatic tire in a linear direction of movement in front of said antenna, said antenna comprising:
    a single winding of numerous turns wound on a support;
    a central part to be located approximately at the center of the conveyor belt;
    two lateral edges to be placed approximately on each side of the conveyor belt,
    strands placed so that flux generated around said strands describe a loop whose plane is perpendicular to the direction of movement at the central part, then changes gradually in orientation to become parallel to the direction of movement, while always remaining perpendicular to the conveyor belt, on moving from said central part toward each of the lateral edges of the antenna.

2. The antenna according to claim 1, wherein an orientation of strands changes gradually and evenly to go from the central part to each of the lateral edges.

3. The antenna according to claim 1, wherein, viewing a median plane of the antenna oriented parallel to the direction of movement of the conveyor belt, and perpendicular to the conveyor belt, the support is formed on each side of said median plane so that wound turns, on one side of the support, have a resulting magnetic axis oriented in a direction opposite a magnetic axis of wound turns on the other side of the support.

4. The antenna according to claim 3, wherein the support is made of nonmagnetic material, formed as a closed loop, folded to take the shape of a figure eight, each strand being formed along said loop and also taking the shape of the figure eight.

5. The antenna according to claim 3, wherein the support is a closed torus, made of nonmagnetic material, on which the strands are wound so as to make a toric winding.

6. An antenna for detecting a signal from an electronic tag implanted in a sidewall or a bead of a pneumatic tire, wherein the pneumatic tire is placed flat on a conveyor belt, and the implanted electronic tag is provided with a winding for transmission of said signal by electromagnetic coupling, said conveyor belt making it possible to move said pneumatic tire in a predetermined movement direction in front of said antenna, said antenna comprising:

a support;

strands formed on the support to generate magnetic flux;

wherein the support has a shape so that flux generated forms a loop whose plane is perpendicular to the predetermined movement direction at a central part of the antenna, then changes gradually in orientation to become parallel to the predetermined movement direction when moving from said central part of the antenna toward lateral edges of the antenna.

7. The antenna according to claim 6, wherein, viewing a median plane of the antenna oriented parallel to the predetermined movement direction, the support is formed on each side of said median plane so that wound turns, on one side of the support, have a resulting magnetic axis oriented in a direction opposite a resulting magnetic axis of wound turns on the other side of the support.

8. The antenna according to claim 6, wherein the support is made of nonmagnetic material, formed as a closed loop, folded to take the shape of a figure eight.

9. The antenna according to claim 6, wherein the support is a closed torus, made of nonmagnetic material.

10. A system for detecting a presence of a pneumatic tire comprising:

a conveyor belt along which said pneumatic tire moves in a predetermined movement direction;

an electronic tag implanted in said pneumatic tire;

an antenna located along said predetermined movement direction so that said pneumatic tire passes past said antenna, said antenna having a shape to generate magnetic flux in a plane perpendicular to said predetermined movement direction at a central portion of the antenna and to generate magnetic flux that changes gradually in orientation to be parallel to said predetermined movement direction at lateral edges of the antenna.

11. The antenna according to claim 10, wherein viewing a median plane of the antenna oriented parallel to the predetermined movement direction, the antenna is shaped so that on one side of said median plane a resulting magnetic axis is oriented in a direction opposite a resulting magnetic axis on the other side of the median plane.

12. The antenna according to claim 10, wherein the antenna is formed as a closed loop, folded to take a shape of a figure eight.

13. The antenna according to claim 12, wherein the antenna is formed on a support made of nonmagnetic material.

14. The antenna according to claim 10, wherein the antenna has a shape of a closed torus, so as to make a toric winding.

15. The antenna according to claim 14, wherein the antenna is formed on a support made of nonmagnetic material.

* * * * *